United States Patent
Harbecke et al.

[11] Patent Number: 5,847,319
[45] Date of Patent: Dec. 8, 1998

[54] FUSE BOX CLOSURE IN A FUSE ASSEMBLY

[75] Inventors: Günter-Gustav Harbecke, Erlensee; Helmut Spáck, Aschaffenburg; Friedrich Schweppe, Eppertshausen, all of Germany

[73] Assignee: Siemens Aktiengesellschaft, Munich, Germany

[21] Appl. No.: 836,825

[22] PCT Filed: Nov. 15, 1995

[86] PCT No.: PCT/DE95/01647

§ 371 Date: Oct. 20, 1997

§ 102(e) Date: Oct. 20, 1997

[87] PCT Pub. No.: WO96/16425

PCT Pub. Date: May 30, 1996

[30] Foreign Application Priority Data

Nov. 18, 1994 [DE] Germany .......................... 44 42 363.2

[51] Int. Cl.[6] .................................................. H02G 3/14
[52] U.S. Cl. ........................... 174/66; 174/52.1; 220/3.8; 361/837; D13/178
[58] Field of Search .................... 174/66, 52.1; 220/241, 220/3.8; 361/642, 641, 833, 835, 837; 337/142, 186, 143, 196; D13/178, 160

[56] References Cited

U.S. PATENT DOCUMENTS

| | | | |
|---|---|---|---|
| 2,881,288 | 4/1959 | Thiede et al. | 337/196 |
| 3,651,441 | 3/1972 | Boudouris | 102/253 |
| 3,910,448 | 10/1975 | Evans et al. | 220/3.8 |
| 4,260,863 | 4/1981 | Appleton . | |
| 4,329,006 | 5/1982 | Gale | 439/335 |
| 4,487,127 | 12/1984 | Lüebbers | 102/253 |
| 4,620,061 | 10/1986 | Appleton . | |
| 5,077,452 | 12/1991 | Mathers et al. | 200/43.01 |
| 5,295,849 | 3/1994 | Jeffcoat et al. | 439/266 |
| 5,310,075 | 5/1994 | Wyler | 220/4.02 |

FOREIGN PATENT DOCUMENTS 0 436 255  7/1991  European Pat. Off. .
41 16058  11/1992  Germany .

Primary Examiner—Bot L. Ledynh
Assistant Examiner—Dhiru R Patel
Attorney, Agent, or Firm—Kenyon & Kenyon

[57] ABSTRACT

A fuse box closure in a fuse assembly of a switch disconnector system, having a fuse cover which detachably closes the fuse box, a fuse-carrier part for accommodating the contact stud of a fusible link being detachably connected to the fuse cover. In the proximity of the outwardly facing fuse carrier, the fuse box is provided with a cylindrical annular groove with which a cylindrical annular contour of the fuse cover engages with form locking in the closed state.

2 Claims, 1 Drawing Sheet

FUSE BOX CLOSURE IN A FUSE ASSEMBLY

FIELD OF THE INVENTION

The invention relates to a fuse box closure in the fuse assembly of switch disconnector systems, having a fuse cover which detachably closes the fuse box, a fuse-carrier part for accommodating the contact stud of a fusible link being detachably connected to the fuse cover.

BACKGROUND INFORMATION

German Published Patent Application No. 41 16 058 describes a fuse box closure in the fuse assembly of a switch disconnector system. As described therein, the fuse box, which is closable with the fuse cover, has a conically shaped, circumferential, annular section which, in the closed state, is surrounded by a V-shaped annular groove inside the fuse cover. Situated between the inner contact surface of the circumferential annular section of the fuse box and the V-shaped annular-groove surfaces of the fuse cover is a seal which acts, by means of the fuse cover, both as a fluid seal and as an electrical seal between the inner and outer region of the fuse box. The fuse cover itself is detachably connected to the fuse box by means of fastening screws.

SUMMARY OF THE INVENTION

An object of the present invention is to simplify the design of the fuse box closure and, in particular, to improve the seal in the electrical region. This is achieved according to the invention by means of the following features:

1.1. the fuse box contains a cylindrical annular groove in the region of the side facing the fuse cover, 1.2. the fuse cover contains a profile-widening cylindrical annular contour in the region of the side facing the fuse box, 1.3. the cylindrical annular contour is configured in such a way that, in the closed state, only the longitudinal sides of the cylindrical annular groove of the fuse box surround the cylindrical annular contour of the fuse cover with form locking.

With a fuse box closure constructed in such a way, in which the longitudinal sides of the cylindrical contours of the cylindrical annular groove of the fuse box and those of the fuse cover surround one another with form locking, the electrical seal for the currents to be prevented represents, in practice, a barrier which displays a blocking effect which is much more far-reaching than the so-called electrical noble-metal joint. In this fuse box closure, the sealing element is essentially limited to covering the regions of the fuse box and fuse cover which are directed towards one another in a planar manner. In this case, there is no need to seal the conically circumferential annular sections. Since only the longitudinal sides of the cylindrical annular groove of the fuse box are surrounded with form locking by the cylindrical annular contour of the fuse cover, the sealing cover is prevented from canting or being placed onto the fuse box in a manner that would allow leakage. Thus, the end regions of the cylindrical annular contour and the cylindrical annular groove do not abut against one another in the closed state.

One advantageous embodiment of the present invention provides the following features:

2.1. the fuse box is closable with the fuse cover by means of a manual lever mechanism which is integrated in the fuse cover and contains fuse-tripping control means, 2.2. in the closed state of the fuse box, the manual lever mechanism causes a fastening lever contour of the manual lever mechanism to act on an annular widened profile of the fuse box.

By means of the manual lever mechanism which is integrated in the fuse cover and, in the closed state, acts with its fastening lever contour on the annular widened profile of the fuse box, a closure is realized without fastening screws. The removal of the fusible link is effected in a simple manner, without fastening screws to be loosened manually, simply by tilting the manual lever mechanism integrated in the fuse cover.

BRIEF DESCRIPTION OF THE DRAWING

The FIGURE shows an exemplary embodiment of a fuse box closure in accordance with the present invention.

DETAILED DESCRIPTION

Figure 1:
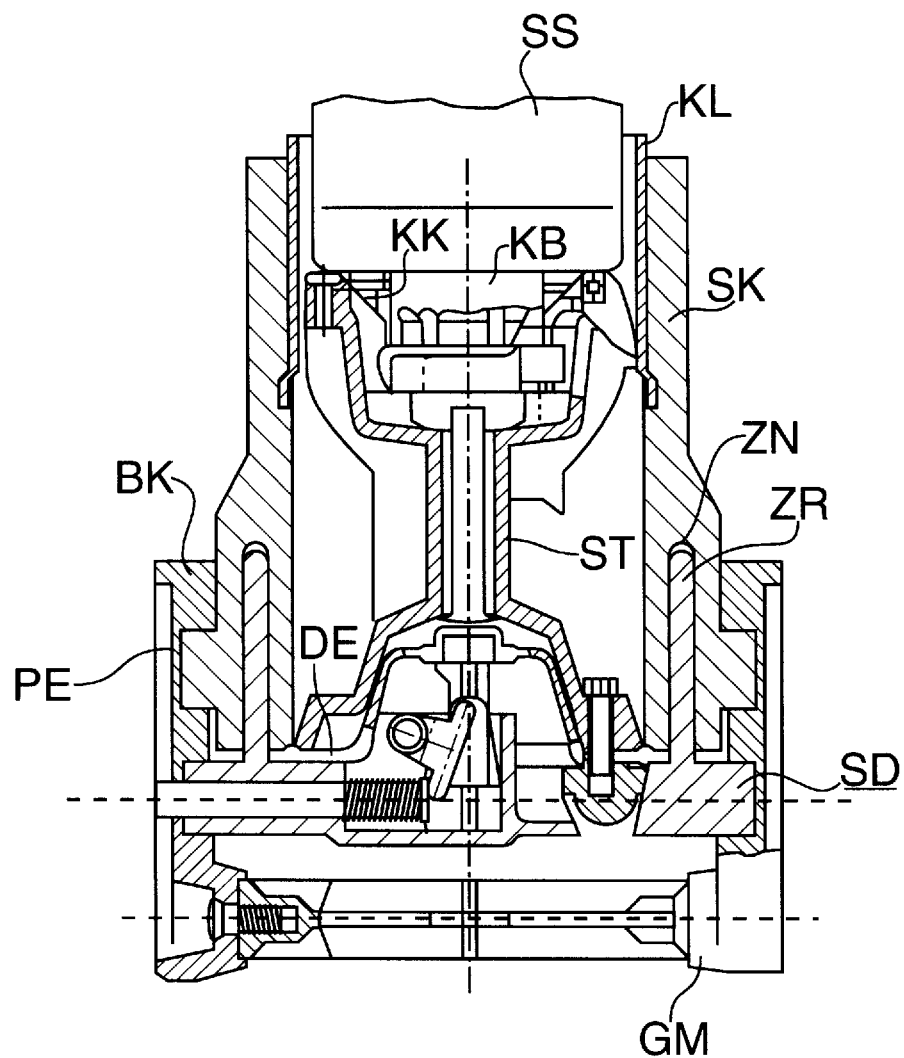

The FIGURE shows a sectional view of an exemplary embodiment of a fuse box SK which can be closed by the fuse cover SD. The fuse box SK has the cylindrical annular groove ZN with which the cylindrical annular contour ZR of the fuse cover SD, in which the manual lever mechanism GM is integrated, engages in the closed state. Furthermore, it can be seen that, on the fuse cover SD, the fuse carrier ST is detachably connected with a fastening screw (not illustrated). In addition, the fuse carrier ST is connected to the clip contact KK, with which the contact stud KB of the fusible link SS engages. The electrical connection to the non-depicted terminal contact is produced by the clip contact KK via the contact conductor KL. Furthermore, it can be seen that, in the region facing the fuse box SK, the fuse cover SD provides the sealing element DE which, in the closed state of the fuse box SK, sealingly closes the interior of the fuse box SK with respect to the external region by means of the fuse cover SD.

The manual lever mechanism GM, which is an integral component of the fuse cover SD, is provided with the fastening lever contour BK which, in the closed state, engages behind the widened profile PE of the fuse box SK. A current-proof barrier between the inner region of the fuse box SK and the outer region is achieved by means of the interlocking, cylindrical contours of the fuse cover SD and the fuse box SK.

What is claimed is:

1. In a fuse assembly of a switch disconnector system, a fuse box comprising:

a fuse cover which detachably closes the fuse box;

a fuse-carrier part accommodating a contact stud of a fusible link, the fuse-carrier part being detachably connected to the fuse cover; and a cylindrical annular groove in a region of a side of the fuse box facing the fuse cover, the cylindrical annular groove having longitudinal sides, wherein the fuse cover includes a cylindrical annular contour in the region of the cover side facing the fuse box, the cylindrical annular contour being configured so that when the fuse cover closes the fuse box, only the longitudinal sides of the cylindrical annular groove of the fuse box surround the cylindrical annular contour of the fuse cover in a form locking manner.

2. The fuse box of claim 1, wherein:

the fuse box is closable with the fuse cover using a manual lever mechanism, the manual lever mechanism being integrated in the fuse cover, and the fuse box including a fuse-tripping control arrangement, and when the fuse cover closes the fuse box, the manual lever mechanism includes a fastening lever and causes the fastening lever contour to act on an annular widened profile of the fuse box.

* * * * *